United States Patent [19]

Michika et al.

[11] Patent Number: 4,881,796
[45] Date of Patent: Nov. 21, 1989

[54] SINGLE-APERTURE MULTI-SPECTRAL RETICLE PROJECTOR

[75] Inventors: David Michika, Santa Ana; Robert J. Brown, Tustin, both of Calif.

[73] Assignee: Ford Aerospace Corporation, Newport Beach, Calif.

[21] Appl. No.: 229,592

[22] Filed: Aug. 8, 1988

[51] Int. Cl.$^4$ ................................................ G02B 5/18
[52] U.S. Cl. ................................ 350/166; 350/172; 350/174; 350/397
[58] Field of Search ................ 350/1.1, 166, 172, 174, 350/397, 566, 576

[56] References Cited

U.S. PATENT DOCUMENTS

| | | | |
|---|---|---|---|
| 2,520,635 | 8/1950 | Grey | 350/1.2 |
| 3,752,587 | 8/1973 | Myers et al. | 356/153 |
| 3,905,708 | 9/1975 | Steck, III | 350/174 |
| 4,139,769 | 2/1979 | McCrum et al. | 250/341 |
| 4,193,666 | 3/1980 | Cojan | 350/174 |
| 4,385,834 | 5/1983 | Maxwell, Jr. | 356/153 |
| 4,417,814 | 11/1983 | Doliber | 250/333 |
| 4,483,587 | 11/1984 | Michon et al. | 350/174 |
| 4,569,591 | 2/1986 | Ford et al. | 356/153 |
| 4,653,911 | 3/1987 | Fortin | 356/153 |
| 4,722,601 | 2/1988 | McFarlane | 350/174 |
| 4,751,571 | 6/1988 | Lillquist | 358/113 |
| 4,811,061 | 3/1989 | Sud et al. | 356/400 |

FOREIGN PATENT DOCUMENTS

| | | | |
|---|---|---|---|
| 0030856 | 3/1979 | Japan | 350/174 |
| 1342405 | 1/1974 | United Kingdom | 350/174 |
| 1373423 | 11/1974 | United Kingdom | 350/174 |
| 2140933 | 5/1984 | United Kingdom | 350/174 |

Primary Examiner—Bruce Y. Arnold
Assistant Examiner—R. D. Shafer
Attorney, Agent, or Firm—Harry G. Weissenberger; Edward J. Radlo; Keith L. Zerschling

[57] ABSTRACT

A multi-spectral reticle projector coaxially projects two separate reticles at different wavelengths through a single aperture by using a lens system including a dichroic lens disposed coaxially between the two reticles. The visible light is reflected by the mirror and passes through the lens system twice, while the infrared light passes through the mirror and passes through the lens system once. At the output of the lens system, the two reticle images are superimposed, collinated and coaxial.

4 Claims, 2 Drawing Sheets

SINGLE-APERTURE MULTI-SPECTRAL RETICLE PROJECTOR

The invention described herein is a subject invention under United States Government Contract No. AAWS-M #DAAH 01-86-C-A061.

FIELD OF THE INVENTION

This invention relates to reticle projectors for optical instruments, and more particularly to a projector using a single aperture to coaxially project separate reticles at different wavelengths to different instruments.

BACKGROUND OF THE INVENTION

Observation systems usable both in daylight and at night typically include a visible-light telescope and an infrared imaging device. Typically, these devices have separate optical paths. Reticle projections in these paths have to be carefully aligned for accurate boresighting, and this alignment is difficult to maintain in a vehicular or aeronautical environment where the equipment is subjected to severe vibration. In addition, size and weight of this type of system is often a critical factor, and it is therefore desirable for the optical path to be as compact as possible.

Prior art in the observation systems field includes: U.S. Pat. No. 3,752,587 which deals with a system for boresighting a combined infrared laser and low-light telescope; U.S. Pat. No. 4,139,769 which deals with a similar system; U.S. Pat. No. 4,385,834 which describes boresighting by aligning two laser beams; U.S. Pat. No. 4,569,591 which relates to a boresight mechanism for a laser/FLIR rangefinder; and U.S. Pat. No. 4,653,911 which discloses a two-path system for forming two images of a reticle for coarse and fine boresighting.

DISCLOSURE OF THE INVENTION

The invention overcomes the problems of the prior art by providing a common optical path (26, 24, 22, 14) for a visible light reticle (29) and an infrared reticle (28). Both reticles are refracted or reflected by the same optical components (26, 24, 22, 14) and are therefore not subject to relative displacement by vibration. The superposition of the visible (20) and infrared (28) reticles is achieved by disposing them on opposite sides of a dichroic lens which reflects the visible light but refracts the infrared light. The initial alignment of the optical components cause the reticle images to be permanently superimposed, collimated and coaxial.

DESCRIPTION OF THE PREFERRED EMBODIMENT

Figure 1:
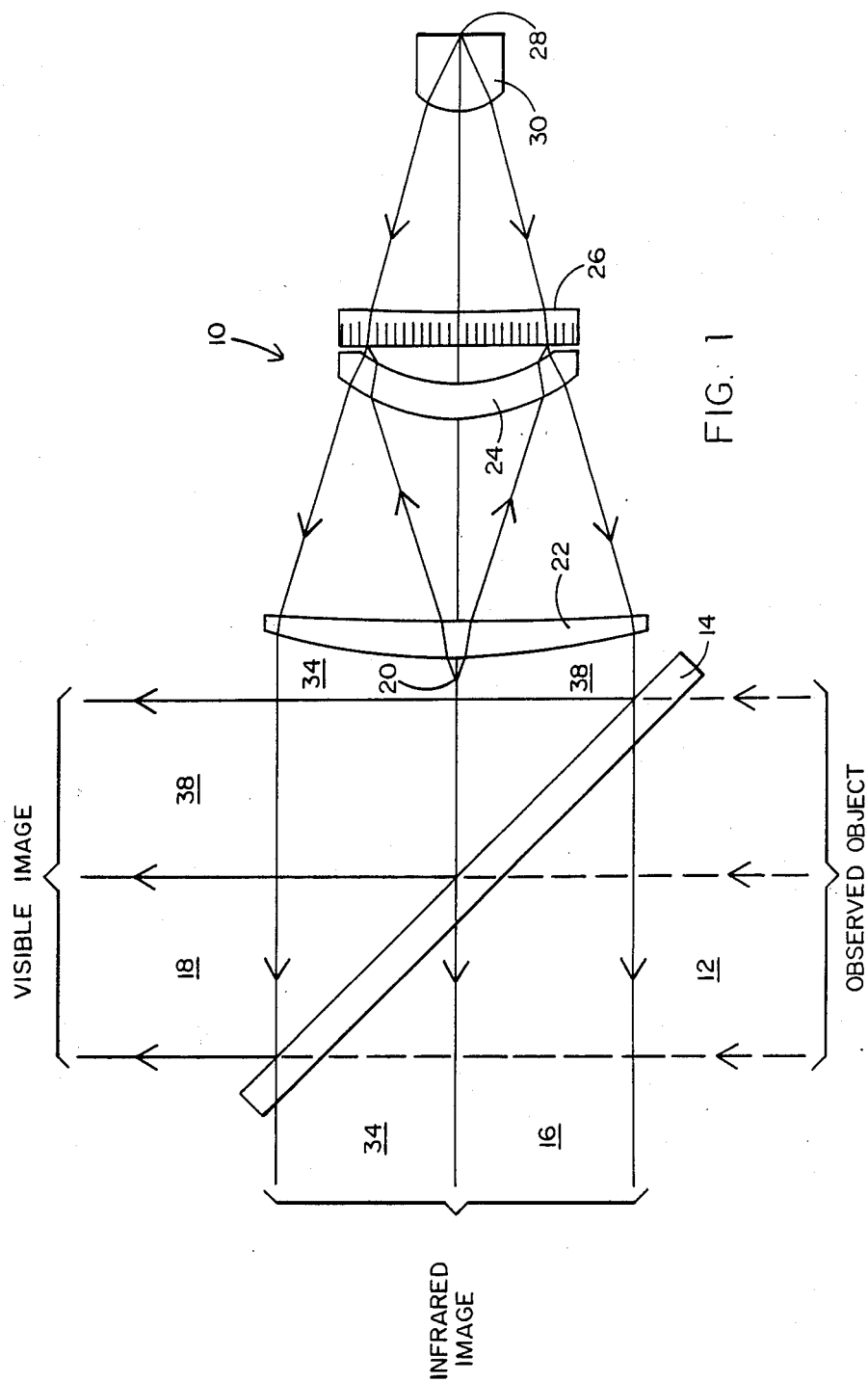
FIG. 1 is a schematic diagram illustrating the system of this invention.

FIG. 1 illustrates the overall arrangement of the reticle projector 10 of this invention. The collimated image beam 12 from the observed object is projected through a dichroic beamsplitter 14 which reflects the infrared portion 16 of the image beam 12 toward a suitable infrared imaging device. The visible light portion of the image beam 12 passes through the dichroic beamsplitter 14 to become the visible image 18 which may be viewed by e.g. a telescope.

A visible image reticle 20 illuminated with visible light is positioned in front of the collimating lens 22. A concavo-convex lens 24 is disposed behind the collimating lens 22 in front of a dichroic lens 26 which reflects visible light but passes infrared light. Behind the dichroic lens 26, an infrared image reticle 28 illuminated with infrared light is disposed on the plane side of a plano-convex lens 30.

Figure 2:
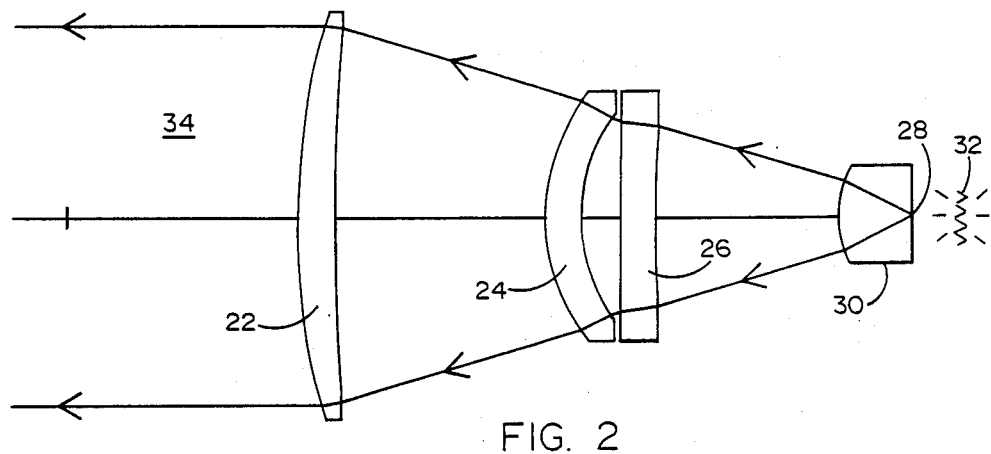
FIG. 2 is a diagram showing the production of the infrared reticle image.
Figure 3:
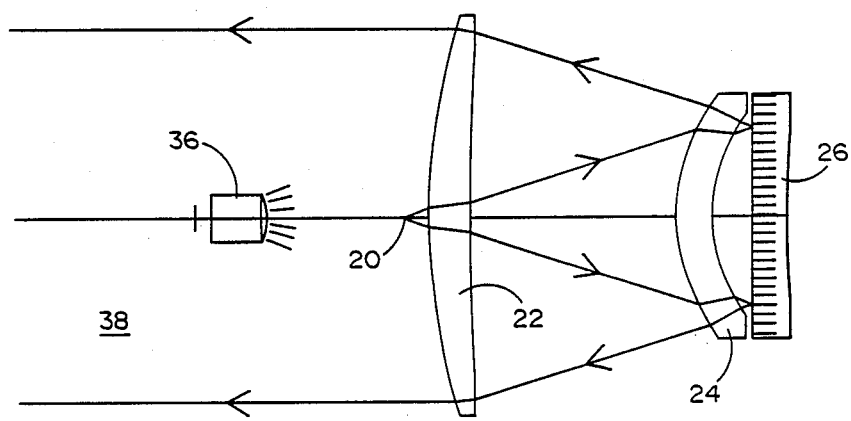
FIG. 3 is a diagram showing the production of the visible-light reticle image.

FIGS. 2 and 3 illustrate the operation of the infrared and visible reticle projection, respectively, in the device of this invention. In FIG. 2, an infrared light source such as a heating element is schematically shown at 32. The source 32 illuminates the reticle 28 and projects its image through holes 30 toward the dichroic lens 26. Because the dichroic lens 26 is transparent in the infrared wavelength band, the beam from lens 30 is merely refracted by lenses 26 and 24, and is then collimated into the infrared reticle image 34 by collimating lens 22.

FIG. 3 illustrates the projection of the visible image reticle. Reticle 20 is illuminated by an appropriate visible light source schematically shown at 36. The image of the reticle 20 is refracted by the collimating lens 22 and the lens 24 and impinges upon the dichroic lens 26. At the wavelengths of the visible light band, the 20 back through the lens 24 toward the collimating lens 22, where it is collimated into the visible reticle image 38.

When the collimated reticle image beams 34 and 38 are projected toward the dichroic beamsplitter 14 (FIG. 1), the infrared reticle image is superimposed upon the infrared object image 16, while the visible reticle image is superimposed upon the visible object image 18.

The coaxial arrangement of the reticles 20, 28 and the lenses 22, 24, 26, 30 makes it possible to mount those components inside a single support such as a tube, which makes it easy to maintain their alignment in adverse environments such as devices subject to severe vibration.

The coaxially of the two reticle images facilitates boresighting because their relative positions to the observer's eye will not change at different viewing angles. Also, the fact that a single aperture or lens system handles both the visible and the infrared reticle images makes the device of this invention highly compact and less expensive to build and maintain than prior art reticle projectors.

It will be understood that the present invention is not limited to visible and infrared light, nor to any particular imaging devices, but that it is applicable to the coaxial projection of any images having different wavelengths separable by dichroic optical elements.

We claim:

1. A single aperture multi-spectral reticle projector, comprising:
   (a) first and second reticles;
   (b) first illumination means for illuminating said first reticle with light of a first wavelength;
   (c) second illumination means for illuminating said second reticle with light of a second wavelength; and
   (d) a dichroic lens interposed between said reticles coaxially therewith, said dichroic lens being reflective at said first wavelength but transparent at said second wavelength;
   (e) collimating lens means interposed coaxially between said first reticle and said dichroic lens for refracting the image of said first reticle on a passage therethrough and collimating said image on a second passage therethrough;

whereby collimated images of said first and second reticles are projected coaxially in the same direction by said dichroic lens.

2. The projector of claim 1, further comprising a concavoconvex lens interposed between said collimating lens means and said dichroic lens.

3. The projector of claim 2, in which said concavoconvex lens is bonded to said dichroic lens.

4. The projector of claim 1, further comprising a plano-convex lens interposed between said second illumination means and said dichroic lens, said second reticle being located on the plane.

* * * * *

UNITED STATES PATENT AND TRADEMARK OFFICE
CERTIFICATE OF CORRECTION

PATENT NO. : 4,881,796
DATED : 21 November 1989
INVENTOR(S) : David Michika and Robert J. Brown It is certified that error appears in the above—identified patent and that said Letters Patent is hereby corrected as shown below:

Column 3, line 2    After "therethrough;" insert --and--;

Signed and Sealed this

Second Day of October, 1990

Attest:

HARRY F. MANBECK, JR.

*Attesting Officer*        *Commissioner of Patents and Trademarks*